(12) United States Patent
Sirajuddin

(10) Patent No.: US 8,384,361 B2
(45) Date of Patent: Feb. 26, 2013

(54) SWITCHING TECHNIQUE FOR EFFICIENT ELECTRICAL POWER UTILIZATION

(75) Inventor: Mohamed Sirajuddin, Tamil Nadu (IN)

(73) Assignee: Advanced Environmental Technologies Limited, Auckland (NZ)

( * ) Notice: Subject to any disclaimer, the term of this patent is extended or adjusted under 35 U.S.C. 154(b) by 720 days.

(21) Appl. No.: 12/525,235

(22) PCT Filed: Feb. 1, 2008

(86) PCT No.: PCT/NZ2008/000016
§ 371 (c)(1),
(2), (4) Date: Sep. 2, 2009

(87) PCT Pub. No.: WO2008/094051
PCT Pub. Date: Aug. 7, 2008

(65) Prior Publication Data
US 2010/0072960 A1    Mar. 25, 2010

(30) Foreign Application Priority Data

Feb. 2, 2007  (NZ) ........................................ 553000

(51) Int. Cl.
*G05F 1/00*  (2006.01)

(52) U.S. Cl. ........................................ 323/212; 323/218

(58) Field of Classification Search .................. 323/212, 323/215, 217, 218
See application file for complete search history.

(56) References Cited

U.S. PATENT DOCUMENTS

| 4,668,923 A | * | 5/1987 | Lofter ............................. 331/16 |
| 5,355,076 A | | 10/1994 | Chadwick |
| 5,739,663 A | * | 4/1998 | Brown ........................... 318/701 |
| 5,825,154 A | * | 10/1998 | Runggaldier et al. ........ 318/757 |
| 6,483,379 B1 | | 11/2002 | Culca |

OTHER PUBLICATIONS

International Search Report, PCT/NZ2008/000016, Jun. 10, 2008.

* cited by examiner

*Primary Examiner* — Matthew Nguyen
(74) *Attorney, Agent, or Firm* — Young & Thompson

(57) ABSTRACT

An active phase angle correction circuit which corrects the phase angle between voltage and current in an AC supply varies the capacitive loading of the AC mains to reduce the phase angle to near zero by detecting the phase angle, reactively and resistively loading the AC mains in steps until the phase angle is at a desired level close to zero, and then maintaining or incrementally adjusting the loading. The applied loading may be continuously switched in and out at a rate much greater than the mains supply frequency.

14 Claims, 5 Drawing Sheets

SWITCHING TECHNIQUE FOR EFFICIENT ELECTRICAL POWER UTILIZATION

TECHNICAL FIELD

The invention generally relates to dynamically varying the load impedances and to the correction of the phase angle between voltage and current on an alternating current supply line.

More particularly the invention relates to the correction of the phase angle between voltage and current on an alternating current supply line using a higher frequency switching method to connect additional reactive loads.

BACKGROUND ART

Transmission of AC power to a remote load is normally assumed to supply an AC waveform in which the current and voltage are in phase for greatest power transfer. This is not the usual case, however, and the loads presented by residential and commercial loads generally provide a reactive and non-linear load, typically inductive, to the power line, resulting in a difference in the phase of voltage and current, normally expressed as a difference angle θ (hereinafter referred to as "phase angle"). There may also be a high harmonic content and additional voltage spikes, both of which affect the connected equipment.

Since this non-zero phase angle supply requires a higher current for the same wattage a non-zero phase angle, or non-unity power factor (cos θ), forces the use of supply lines with greater current capacity, which cost more to provide. To help in correcting a non-zero phase angle power companies normally provide power factor correction at distribution points on the network by means such as synchronous condensers. Despite this the load at each consumer still normally presents an inductive load which is not fully compensated resulting in a non-unity power factor and reduced efficiency in the power distribution system and in the use of the power at the consumer premises. Many electricity suppliers base their charges on the component of power used at zero phase angle or penalise power factors greater than a certain value, such as 0.9, in an effort to encourage greater efficiency by consumers.

Various methods of providing correction at consumer premises have been proposed, such as capacitor banks floated across the consumer line. Such capacitors are normally selected based on the expected load or the prevailing power factor and are not variable. Additionally these methods are expensive to implement and do not necessarily provide a consistent unity power factor.

U.S. Pat. No. 5,355,076 to Chadwick describes one such method in which capacitances are connected in series with a load for at least part of a cycle of the supplied AC waveform.

Therefore a need exists for a solution to the problem of providing a relatively cheap and efficient method of creating an AC supply waveform with unity power factor from an AC supply with non-unity power factor.

The present invention provides a solution to this and other problems which offers advantages over the prior art or which will at least provide the public with a useful choice.

Theory of Operation for Switching Technique:

The term "impedance matching" here means making the non-linear load on the mains line appear to the mains source as a linear load of pure resistance.

It is possible to provide power factor correction by dynamically synthesizing RC networks across the user load which are mostly non-linear in nature. The switching network models and presents the load as linear element to the power source. This reduces the eddy current and $I^2R$ losses which in turn leads to efficient power transfer and energy savings.

Consider an AC voltage source, $$V = V_m \sin 2\pi ft \quad (1)$$

Where $V_m$ is the peak voltage and f is the power supply frequency. The corresponding AC current flowing through a load of fixed resistor R is given by, $$i = \frac{V_m}{R} \sin 2\pi ft \quad (2)$$

If the fixed resistor R is switched with a time period T the load is synthesized as different resistor R' whose value depends on the duty cycle in the following manner.

The synthesizing of a resistor R' from a resistor R where the resistor is switched into a circuit for a time $T_{on}$ is:

$$R' = \left(\frac{T_{on} + T_{off}}{T_{on}}\right) R \quad (3)$$

Where $T_{on}$ is the on time and $T_{off}$ is the off time. The term under the bracket represents the duty cycle. The current flow through this synthesized resistor is given by, $$i_R = \frac{V_m}{R}\left(\frac{T_{on}}{T_{on} + T_{off}}\right) \sin 2\pi ft \quad (4)$$

Now consider the case of capacitive loads,
A.C. Current flowing through a capacitor C connected to the source voltage V is given by, $$i = C\frac{dv}{dt} \text{ i.e.} \quad (5)$$
$$i = 2\pi fCV_m \cos 2\pi ft$$

Similarly, if the capacitor is switched into circuit for part of the time the load is represent as a different value C' given by $$C' = \left(\frac{T_{on} + T_{off}}{T_{on}}\right) C \quad (6)$$

The current through this synthesized capacitor is given by, $$i = 2\pi fC'V_m \cos 2\pi ft \quad (7)$$

Substituting the value of C' in terms of the capacitor C the load current is given by, $$i_c = 2\pi fCV_m\left(\frac{T_{on}}{T_{on} + T_{off}}\right) \cos 2\pi ft \quad (8)$$

The following values of the synthesized resistors and capacitors at different duty cycles have been obtained. The fixed values of resistance and capacitor were R=9.1 kΩ and C=91 µF. This combination has a time period RC of 0.828 sec. Table 1 given below shows that keeping the time period fixed at 10 ms (switching frequency 10 kHz) and varying the $T_{on}$ and $T_{off}$ maintains the time constant RC to the original value.

TABLE 1

| $T_{on}$ (ms) | $T_{off}$ (ms) | R' (KΩ) | C' (μF) | R'C' (sec) |
|---|---|---|---|---|
| 9 | 1 | 10.1 | 81.9 | 0.827 |
| 8 | 2 | 11.3 | 72.8 | 0.822 |
| 7 | 3 | 12.9 | 63.7 | 0.821 |
| 6 | 4 | 15.1 | 54.6 | 0.824 |
| 5 | 5 | 18.2 | 45.5 | 0.828 |
| 4 | 6 | 22.7 | 36.4 | 0.826 |
| 3 | 7 | 30.3 | 27.3 | 0.827 |
| 2 | 8 | 45.5 | 18.2 | 0.828 |
| 1 | 9 | 91.0 | 9.1 | 0.828 |

The results emphasize that the product of the switched resistor R and the switched capacitor C (RC) should be constant. The technique can be applied to fixed value of $T_{on}$ and $T_{off}$ for a given switching frequency and different values of R and C with the condition that RC remains constant. For practical implementation the value of R and C is selected such that $C=2^n$ (where n=0, 1, 2, 3 ... ). By using an 8 bit binary data 8 different capacitors ranging from 1 μF, 2 μF, 4 μF ... 256 μF can be switched to get different conditions based on the load.

Electrical Power Equation for Switching Technique:

Where the parallel combination of a switched resistor R and a switched capacitor C is placed across a non-linear load with an AC voltage V applied to it the total power P consumed is given by, P=V.i. cos Φ cost where Φ is the phase angle between voltage V and the load current i.

The total current $I_t$ is given by $$i_t = i_R + i_C + i_L$$

Thus the total power is given by $$P = [V(i_R + i_C) + Vi_L] \cos \Phi \quad (9)$$

Substituting the values of $i_R$ and $i_C$ from equations (4) and (8)

$$P = \left\{ V \left[ \frac{V_m}{R} \left( \frac{T_{on}}{T_{on} + T_{off}} \right) \sin 2\pi ft + 2\pi f C V_m \left( \frac{T_{on}}{T_{on} + T_{off}} \right) \cos 2\pi ft \right] + Vi_L \right\} \cos \phi$$

The peak voltage $V_m$, and r.m.s voltage V are related by $V_m = \sqrt{2}V$ where the applied voltage is a sine voltage. The above given equation can be written as, $$P = \left\{ \sqrt{2} V^2 \left( \frac{T_{on}}{T_{on} + T_{off}} \right) \left[ \frac{\sin 2\pi ft}{R} + 2\pi fCC \cos 2\pi ft \right] + Vi_L \right\} \cos \phi \quad (10)$$

The power equation contains the terms $T_{on}$, $T_{off}$, R and C which can be controlled to optimize the value of electrical power transfer to the user load by "impedance matching" the source and load impedances.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

SUMMARY OF THE INVENTION

In one exemplification the invention consists in a phase angle correction circuit for an AC supply consisting of a phase angle detection circuit detecting the difference in phase between voltage and current of the AC supply, a counter circuit whose peak count is a function of the prevailing phase angle detected, a switchable reactance bank, characterised in at least some of the reactances in the bank being connectable across the power supply based on the maximum count reached by the counter.

Preferably the reactances are connected across the power supply by switches, the switch connection being initiated from the counter output.

Preferably the reactances remain connected for at least a set period of time regardless of variations in phase angle.

Preferably the counter circuit is clocked by a free running oscillator.

Preferably when the maximum count is reached a reactance is connected across the AC load, or if one or more reactances are already connected an additional reactance is connected.

Preferably the reactances are equal value.

Preferably each reactance is associated with a resistance.

Preferably the resistance is in parallel with the reactance.

Preferably the reactance is a capacitance.

Preferably each resistance/capacitance combination has an identical RC time constant.

Preferably t the reactances are of binarily stepped values and are connected in reactive value sequence to a value required to correct the phase angle.

Preferably reactances are disconnected in sequence if the phase angle reduces.

In an alternative embodiment the invention relates to a method of correcting the phase angle of an alternating current mains supply by monitoring the instantaneous phase angle between supply voltage and supply current, connecting and disconnecting across the mains supply for at least a fraction of a cycle per cycle of the alternating current one or more of a number of compensating circuits and varying the connected compensating circuits in accordance with the monitored phase angle.

In a further embodiment the invention relates to a method of correcting the phase angle between voltage and current of an alternating current mains supply by monitoring the instantaneous phase angle between supply current and supply voltage, connecting at least some phase angle compensating components to the mains supply where the phase angle is lagging, repetitively monitoring the instantaneous phase angle between supply current and supply voltage characterised in incrementally increasing the connected compensation when the phase angle is detected as lagging, and removing all compensation where the phase angle is detected as leading.

Preferably the compensating components are connected in a known sequence to provide incrementally increasing compensation for a lagging phase angle.

Preferably the sequence has a base connection period for one compensation component circuit much shorter than one cycle of the alternating mains supply.

Preferably the sequence base connection period is less than one tenth of the period of one cycle of the alternating current mains supply.

Preferably the sequence connection period is regular and forms a base frequency at least two orders of magnitude greater than the alternating current mains supply frequency.

Preferably the connection/disconnection ratio is approximately 1/1.

Preferably a compensating components are the parallel combination of a capacitor and a resistor.

Preferably the value of the resistor in megohms multiplied by the value of the capacitor in microfarads is substantially constant for all compensating circuits.

Preferably the value of reactance of a compensating circuit is half or twice that of the next compensating circuit in a sequence.

These and other features of as well as advantages which characterise the present invention will be apparent upon reading of the following detailed description and review of the associated drawings.

DESCRIPTION OF THE INVENTION

Figure 1:
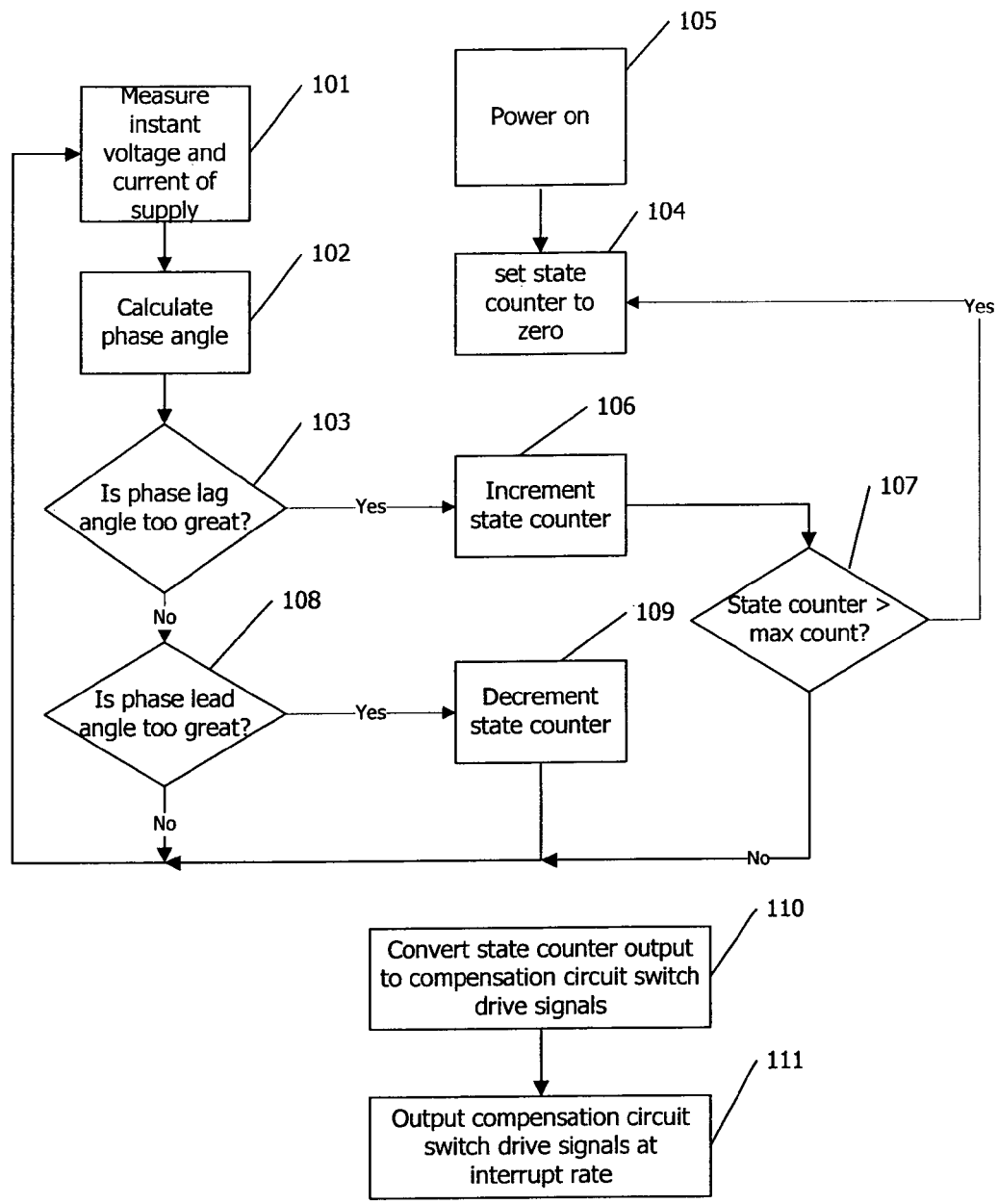
FIG. 1 is a flow diagram of a complete phase angle correction apparatus.

Referring now to FIG. 1 this show a block diagram of a preferred version of the inventive power phase angle correction apparatus. A required feature of the inventive apparatus in the preferred embodiment is a state counter maintaining a count representing the current state of compensation, since this cannot be derived by measurement of the instant phase angle. FIG. 1 shows the initial setting of this counter to zero at switch on of the apparatus at blocks 104, 105. Once the apparatus is functioning the instantaneous voltage and current are measured at 101 and provided to a portion of the apparatus at 102 where the difference in phase between voltage and current derived. At 103 the phase angle derived is compared with the maximum preferable angle and if above this the state counter count is raised one count at 106. At 107 the resultant count is compared to the maximum correction possible in the output and if above it the state counter is reset at 104 and the count restarts. If the count derived is below maximum the process of monitoring the instant phase angle and adjusting the count in the state counter is repeated. The state counter count is converted to an output suitable for driving the compensation circuits at 110 and this output is switched at an interruption frequency higher than the AC supply frequency at 111.

Figure 2:
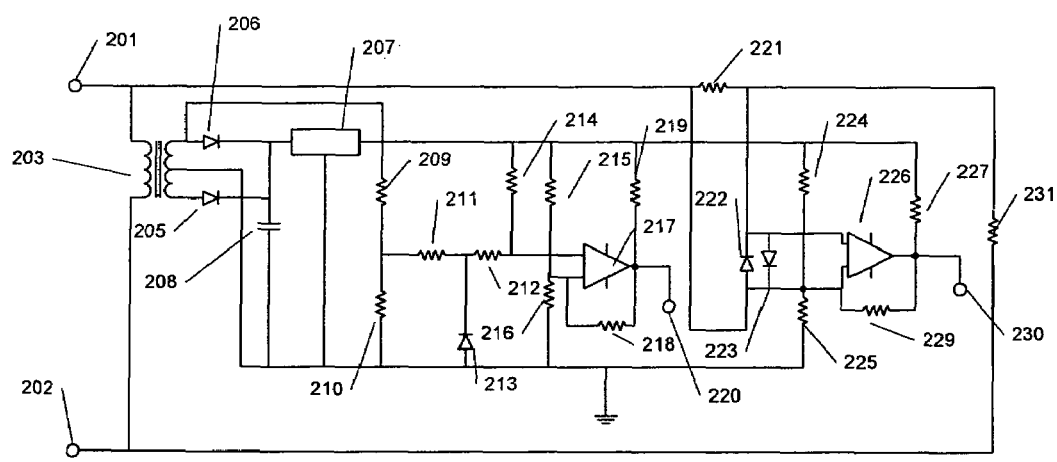
FIG. 2 is a circuit diagram for the portion of the apparatus which provides a signal representative of the phase difference between supply voltage and current.

FIG. 2 shows the derivation of the current and voltage from the input AC supply as required for block 101. To accomplish this the AC supply is applied to terminals 201, 202 with transformer 203 to provide a DC supply for the sensor circuit via diodes 205, 206, smoothing capacitor 208 and regulator 207. A portion of the AC voltage from the transformer is applied via voltage divider 209, 210, current limiting resistors 211, 212 and protection diode 213 to one terminal of operational amplifier 217. Bias from the DC supply via resistors 214, 215, 216 and positive feedback via resistors 218, 219 establishes both the operating point and the gain of amplifier 217 so that it acts as a comparator to provide at 220 a square wave, with the transition points at the zero crossing time of the AC voltage waveform.

A signal representative of the AC current is derived from low value resistor 221 in series load resistor 231 which represents the load which the phase angle correction apparatus is supplying. As such the load represented is not normally resistive, but typically has an inductive content.

AC voltage from across resistor 221 is passed to operational amplifier 226, with bridging diodes 222, 223 providing overvoltage protection by conducting on peak currents to limit the voltage applied to the amplifier. The amplifier is biased by resistors 224, 225 and the gain established with positive feedback via resistors 227, 229 so that it acts as a comparator. An output at 230 provides a square wave with transitions at the zero crossing points of the AC current waveform.

Figure 3:
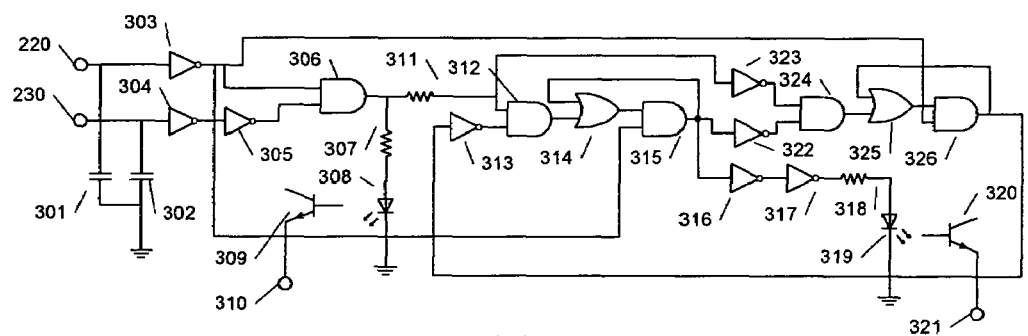
FIG. 3 is a block diagram in greater detail of the pulse voltage creation portion of the phase angle correction apparatus.

FIG. 3 shows one version of a circuit to provide a signal representative of the phase angle θ, suitable for controlling the compensation for decreasing the phase angle between voltage and current to nearer the desired value of zero, and also a signal indicating whether the phase angle of the current leads or lags the voltage. The current and voltage derived waveforms from FIG. 1 are applied at 220, 230 with capacitors 301, 302 acting to remove high frequency fluctuations from the waveform. A version of the voltage waveform inverted at 303 is applied to one input of AND gate 306 together with a version of the current waveform in uninverted form via inverters 304, 305. The output of the AND gate 306, equivalent in pulse width to the difference in phase of the voltage and current waveforms is output via resistor 307 and photodiode/phototransistor opto-isolator pair 307, 308 to terminal 310.

Dealing next with the sub-circuit of AND gate 312, OR gate 314 and AND gate 315, and assuming that the input to inverter 313 is low, AND gate 312 output will go high when the output of AND gate 306 is high, that is, for the period during an AC waveform when the current and voltage are not in phase. Hence the output of OR gate 314 will go high, and with the output of inverter 303 is applied to AND gate 315.

Feedback from gate 315 ensures that once high the AND gate output will stay high until the inverted voltage waveform goes low. This output is buffered in inverters 316, 317 and forms the output to opto-isolator 319, 320 via resistor 318. A high output here indicates a leading phase angle, a low voltage a lagging angle. The same output signal goes to the sub-circuit of AND gate 324, OR gate 325 and AND gate 326. In the same manner as the previous sub-circuit this receives an inverted version of the output of AND gate 306, together with that from the previous sub-circuit to provide a waveform which goes high when the voltage output at 306 is low and the output from 315 is low, holding high until the voltage waveform at 303 goes low. The output from gate 328 therefore inhibits the output of gate 315 via inverter 313 for as long as the output of inverter 303 is high. This results in a bistable action with the output switching from high to low as the phase angle changes from leading to lagging.

The inverters are preferably portions of an SN74LS04, the AND gates preferably form part of an GD74HC08, the OR gates form part of a SN74LS32 and the opto-isolators may be 4N35 components.

Figure 4:
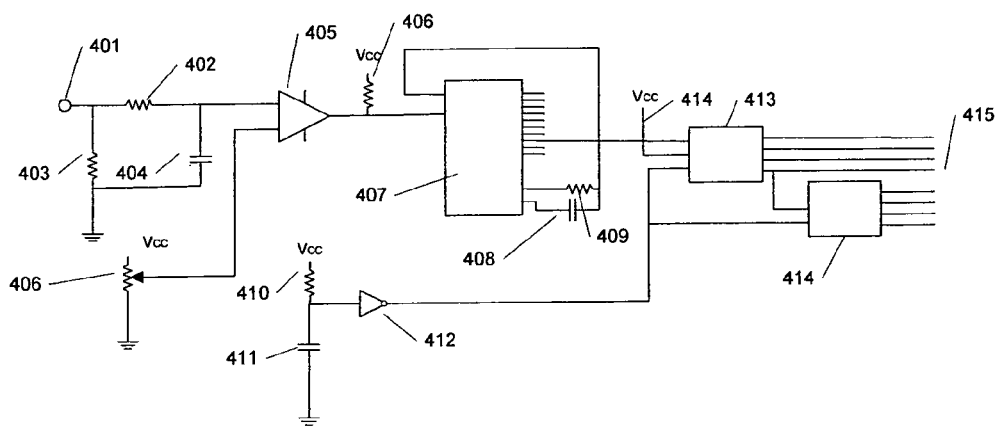
FIG. 4 is a circuit of the derivation of the digital address which drives phase angle correction components.

FIG. 4 shows how, having derived a square wave signal representative of the phase angle requiring correction this signal from 310 in FIG. 3 to 401 in FIG. 4 is applied via integrating circuit 403, 402, 404 to an operational amplifier 405. The time constants of the integrator are such that the integrator output is a sawtooth waveform, and this tends to remove jitter from the phase angle representative pulse waveform. The other input to operational amplifier 405 is from potentiometer 406, which adjusts the operating point of the amplifier with so that the output of the amplifier corresponds to a set level on the sawtooth waveform. This provides a pulse output from amplifier 405 which goes low for a detected phase difference between voltage and current but which can be trimmed with potentiometer 406 so that smaller phase angles do not produce an output. Thus a "dead band" in the range from approximately 3° lead to 3° lag may be produced to prevent constant alteration of the compensation applied when the phase angle is near zero. The output from op amp 405 is pulled high by resistor 406 if no pulse input is present and is applied to the reset input of counter 407 to normally disable it. Counter 407 is preferably a CD4060 and contains an oscillator using components 408 and 409 and a 14 stage ripple binary counter. The oscillator operating frequency is such that an output from the $12^{th}$ ripple stage is at approximately 2 seconds per ON/OFF cycle when the counter is enabled. Typically, when a pulse width representing a phase angle greater than 5° is applied to the circuit the counter reset signal is removed and the counter begins counting. Should it reach a count sufficient to change the state of the $12^{th}$ ripple stage before the pulse falls and the counter resets, a clock pulse goes from the counter 407 to the first part of state counter 413, 414.

State counter 413, 414 is an 8 bit binary counter providing an N of 8 output, that is any number N of the 8 output stages may be high or low at once. It may, for instance comprise two 74163 synchronous 4-bit counter integrated circuits. The state counter produces an output on the eight output lines 415 which is clocked upwards one bit for each clock pulse from op amp 405 representing a detected phase angle greater than a set figure, for instance 5 degrees, where this is equivalent to the count required to produce a pulse at ripple stage 12 of counter 407. A power failure returns the state counter to a count of zero via a reset from resistor 410, capacitor 411 and inverter 412. The eight output address lines from counters 413, 414 are presented as output lines 415.

Figure 5:
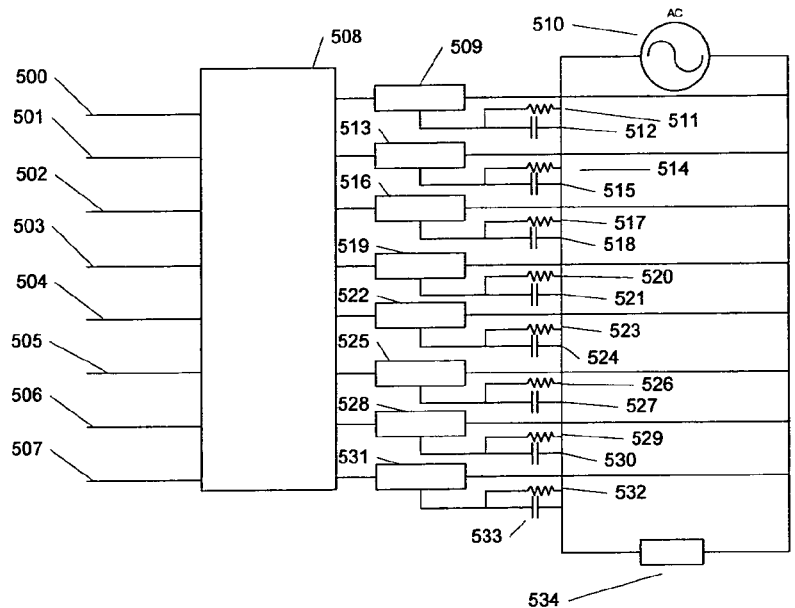
FIG. 5 is a diagram of the address translation and phase angle component switching portion of the apparatus.

FIG. 5 shows these eight output lines 415 presented as inputs 500, 501-507 to a processor 508. The processor preferably implements the algorithm shown in FIG. 6 where all address lines are examined at 601, and if all are low the output address zero (input 500) is set high at 603 regardless of whether address line zero is high or low. This is not essential but is intended to provide some smoothing action to noise on the AC waveform at all times. The other addresses are then sequentially checked at 602, 607 and if high the address line state out for each is set high at 608. At 604 the AC voltage signal is constantly checked and at zero crossing, preferably as detected in the circuit of FIG. 1, the address is passed through at 605 to the state toggle process at 606. Here each of the address lines which has the state set to high is toggled high and low at the switch interruption rate, which is typically 20 KHz. The interrupted output of the address lines is output from the processor 508 of FIG. 5 for application to the switches connected to the compensation circuits.

Each of the address lines from the processor drives a different one of switches 509, 513, 516, 519, 522, 525, 528, 531. Each of switches 509, 513, etc acts to connect across the AC supply line one of RC circuits 511, 512; 514, 515; 517, 518 etc.

Thus the switches act so that, when the appropriate output from the processor is high, RC networks 511,512; 514, 515 etc. are shunted across the AC line if the appropriate address line is high, with the proviso that the networks are switched in and out at the 20 KHz rate. Preferably the product of the capacitance in microfarads and the resistance in kilo-ohms of each RC network is 1, so that if capacitor 512 is 0.1 microfarad, resistor 511 is 100K ohm. Preferably each step in the RC networks has twice the capacitance of the step before, so that capacitor 515 would be 0.2 microfarads and resistor 514 50000 ohms, capacitor 516 0.4 microfarads and resistor 515 25000 ohms, etc. As the applied control signals vary in an N of 8 digital manner to provide 256 different addresses the load provided by the RC combinations can be varied in a step by step manner with, each step equal to the smallest reactance RC network. This provides across the mains line a phase angle correcting load varying from a lightly capacitive load to a highly capacitive load, and preferably the variation is sufficient to account for the load supplied regardless of normal variations in phase angle. This provides "impedance matching" of the load to the mains source. In abnormal circumstances the state counter cannot lock, but will keep cycling until a match which does reduce the phase angle to zero is found.

Switching modules 509, 513 etc. may be commercial switching modules providing the required current switching ability at the 20 KHz frequency. Such modules are available for pulse width modulated control of AC motors or supplies and typically use MOSFETs or IGBTs and are available to match low level digital drive signals. One such may use the ST Semiconductors L6668 Smart Primary Controller in conjunction with the ST Semiconductors STGE200NB60S IGBT in bridge configuration for a 150A capability. Typically 50 A IGBTs provide sufficient capacity to cope with a small workplace.

Figure 9:
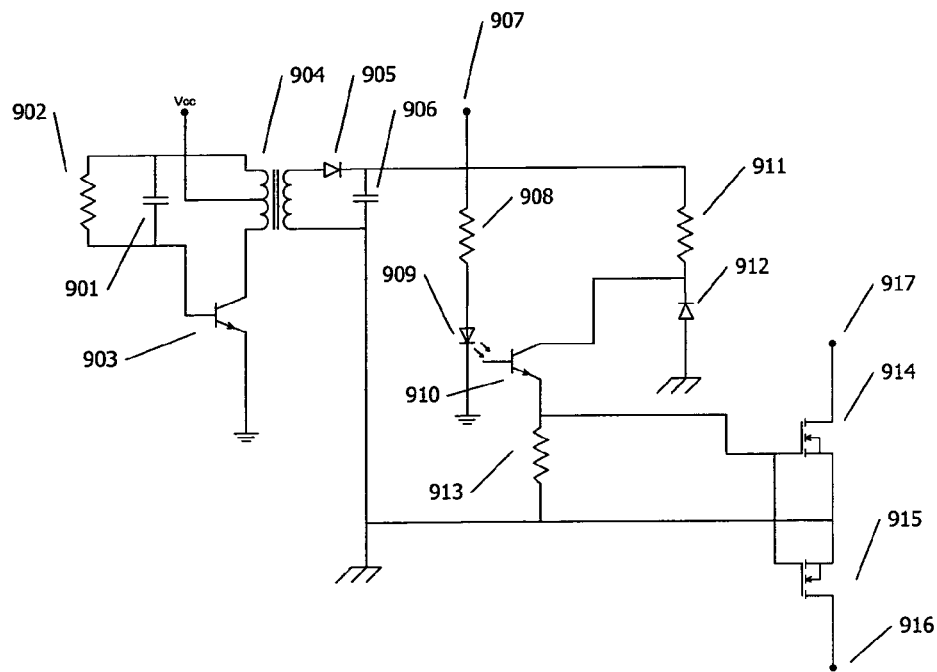
FIG. 9 shows an electronic switch suitable for switching the RC compensating networks into circuit.

FIG. 9 shows an alternative switch module in which a Hartley oscillator of capacitor 901, resistor 902, tapped transformer 904 and transistor 903 is supplied from Vcc. The oscillator output from transformer 904 is rectified at 905 to provide an isolated DC supply smoothed by capacitor 906 which drives transistor 910 via resistor 911 and blocking diode 912. The switching voltage from processor 508 is supplied at 907 to resistor 908 and LED 909. When the switching voltage is high transistor 910 is biased on to provide a drive voltage across resistor 913 to the gates of IGBT's 914, 915 which are connected at 916, 917 to the AC supply voltage and capacitor/resistor pairs of FIG. 5.

Where desired the switch modules may be switched at a variable on/off ratio to provide a synthesised value of R and C which provides the required "impedance matching".

Figure 6:
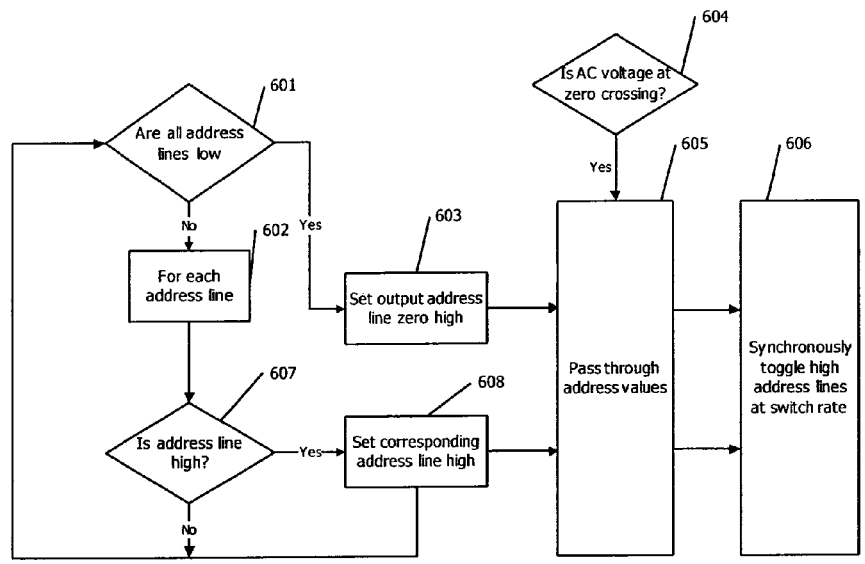
FIG. 6 is a flow diagram of the address translation portion of FIG. 5.
Figure 7:
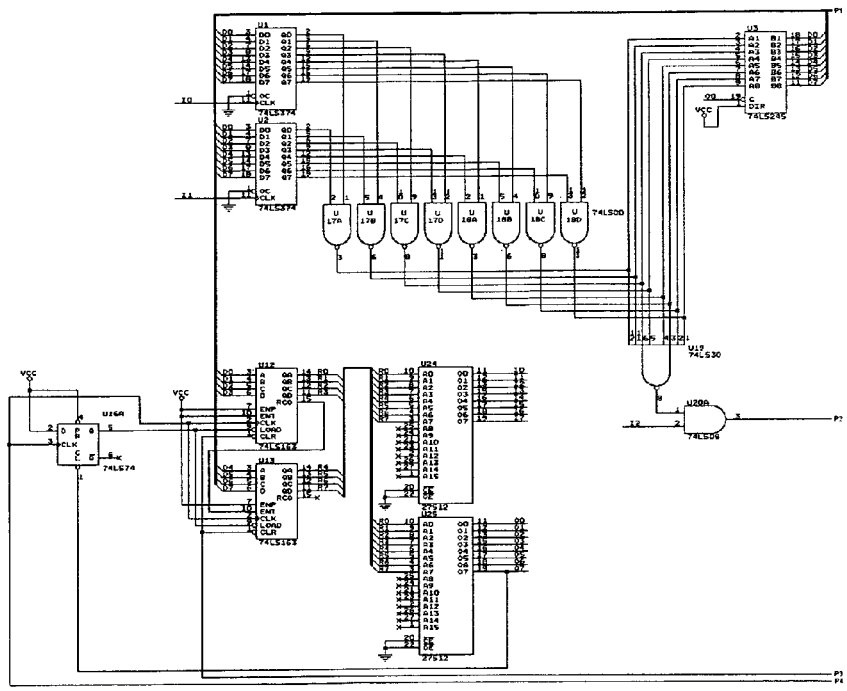
FIGS. 7 and 8 combined show one possible processing circuit for implementing the flow diagram of FIG. 6.
Figure 8:
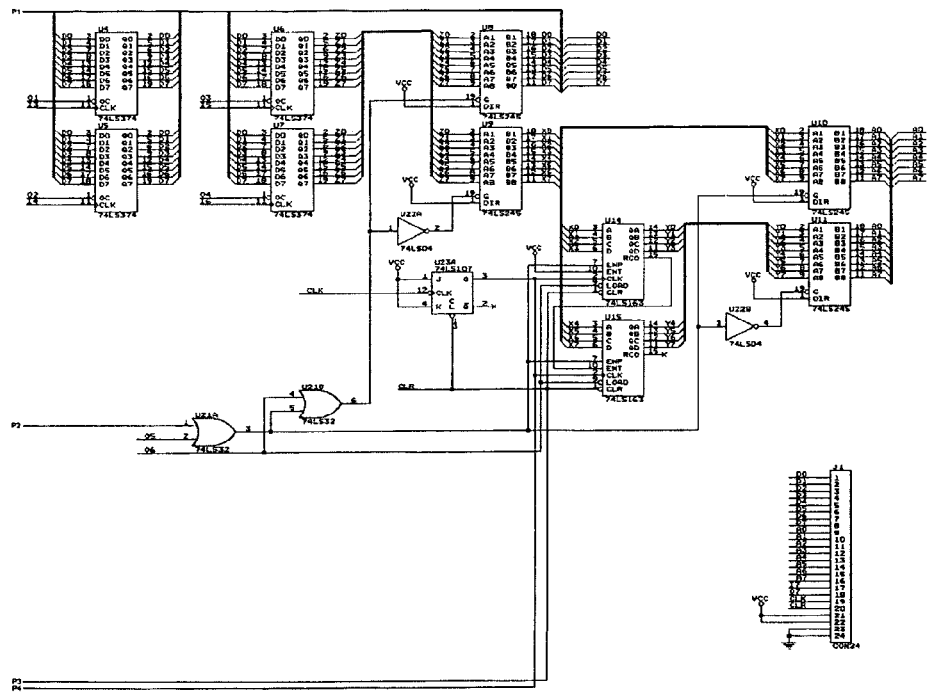

FIG. 7 and FIG. 8 show the parts of a processor 508 according to the invention. While constructed out of simple 74NN series digital integrated circuits the processor in conjunction with EPROMs containing the equivalent algorithm to that of FIG. 6 is a practical example of a processor capable of forming part of the present invention. In this circuit U1, U2, U4, U5, U6 and U7 are 8 bit tri-state flip flops acting as registers for the input signal and control signals, U3, U8, U9, U10 and U11 are 3 state octal transceivers, and U12, U13, U14 and U15 are 4 bit counters. Under imposed clock and address signals these act to detect the amplitude of the phase lead or lag and select using EPROMs U24 and U25 the incremental connection of the various compensating circuits of FIG. 5.

It should be noted that the configuration described is not capable of reducing the number of RC circuits connected, and will merely add compensation until a near zero phase angle is reached, without allowing changes should the inductive loading reduce. Implementing a configuration which does allow reduction is simple and an arrangement detecting when the output 321 changes from high to low and resetting the state counter so that the "impedance matching" process is repeated will achieve the desired effect. Other more elegant methods of performing an actual count down may be provided.

The connection of the corrective load is made in a cyclic manner at a frequency above the mains supply frequency, and preferably in the region of 20 KHz by a subroutine within the processor as described above. Each of the corrective component combinations is connected for a short period then disconnected for a short period. The connected/disconnected ratio may be from 50/50 to 90/10 but is preferably 70/30. In this manner there is an initial inrush current to the reactive correction components at each connection which acts to increase the effectiveness of the applied correction. Any residual voltage across the capacitor when the correction component is disconnected degrades through the parallel resistor to at least some extent before the component is reconnected. Any remaining artifacts of the switching process may be filtered by placing a low value capacitance across the mains supply.

While the exemplification shown uses the combination of a parallel resistor and capacitor combination other circuits may accomplish the same end, for instance a series resonant circuit tuned to an appropriate frequency may be added to remove specific harmonics or snubbing resistors added across the switch or other combinations of components used which will have the effect of modifying the phase angle of the applied supply voltage. The circuit version shown has the property of substantially reducing harmonics of the power frequency. The use of reactive circuits with a constant value of R times C equal to 1 in conjunction with a switching frequency of 20 KHz for a 50 Hz mains supply and a mark/space ratio of approximately 70/30. The connection/disconnection ratio is seen as a prime factor in this reduction. Maintaining the same RC value for each circuit ensures that switching the different circuits into place does not, of itself, create artifacts: Since the time constant of the RC value is large compared to the typical 20 KHz cyclic switching frequency of the compensation component and the 50 or 60 Hz AC supply frequency the voltage on the capacitor degrades very little when the cyclic switch is disconnected.

Nevertheless it is not a requirement that the value of the reactive component multiplied by that of the resistive component be equal to a constant of 1. The value may equally well be 0.5, 2, 3 or any specific value which provides an acceptable reduction in phase angle. Nor is it a requirement that the value of all combinations be precisely equal to the specified constant, but typically equal within the standard component tolerance of 20%. Similarly it is not a requirement that the switching frequency be precisely 20 KHz for a 50 Hz mains supply since other frequencies will provide a solution which gives an adequate reduction in phase angle, but frequencies from 10 KHz to 100 KHz are a preferred option.

While the desired phase angle is zero the practicalities of an alternating current supply dictate that it is not feasible to reduce the phase angle to zero degrees and maintain it there. Typically changing harmonics on the incoming supply and changing loading at the consumer premises ensure that it is impossible to maintain a consistently zero phase angle, and the invention is aimed at reducing the phase angle to a realistic figure of no more than 5 degrees and substantially maintaining the phase angle within plus or minus 5 degrees of zero.

The embodiment shown uses a variety of standard logic integrated circuits to provide the digital signal handling. The functions of these circuits could be provided by several differing means of which the one alternative is a programmed logic array in combination with interface circuits to the required analog circuitry and another is a micro-processor. Such variations fall within the invention.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the phase angle correction apparatus may vary dependent on the particular application for which it is used without variation in the spirit and scope of the present invention.

In addition, although the preferred embodiments described herein are directed to phase angle correction circuits for use in a small commercial or domestic systems, it will be appreciated by those skilled in the art that the teachings of the present invention can be applied to other systems such as stand-alone generators, without departing from the scope and spirit of the present invention.

INDUSTRIAL APPLICABILITY

The phase angle correction circuit of the invention is used in the reduction of phase angle between alternating mains supply current and voltage and to match the source and load impedances at the electricity consumer, thereby providing more efficient driving of the consumer loads and requiring less costly fixed wiring and machinery. The present invention is therefore industrially applicable.

The invention claimed is:

1. A phase angle correction circuit for an AC supply, the phase angle correction circuit comprising:
   a phase angle derivation circuit deriving a difference in phase between voltage and current of the AC supply;
   a state counter maintaining a count representing a current state of correction, the count representing the derived phase angle; and
   a phase angle correcting variable load, at least some of the phase angle correcting variable load being connectable across the AC supply based on the current state counter count, the connected phase angle correcting variable load being variable in a step-by-step manner,
   wherein the phase angle correcting variable load has a reactive value and a resistive value, and
   a product of the reactive value and the resistance value at each step being substantially a constant value.

2. The phase angle correction circuit as claimed in claim 1, wherein the phase angle correcting variable load is connected across the AC power supply by switches, the switch connections at each step being initiated from an output of the state counter.

3. The phase angle correction circuit as claimed in claim 1, wherein the phase angle correcting variable load at each step remains connected for at least a set period of time regardless of variations in phase angle.

4. The phase angle correction circuit as claimed in claim 1, wherein a reactive value change at each step is of equal value.

5. The phase angle correction circuit as claimed in claim 1, wherein at each step the load reactive value is produced by a capacitance and the resistive value is produced by a parallel resistance.

6. A method of correcting a phase angle of an alternating current mains supply, the method comprising:

monitoring an instantaneous phase angle between supply voltage and supply current;

connecting and disconnecting across the mains supply for at least a fraction of a cycle per cycle of the alternating current one or more number of compensation circuits; and varying the connected compensation circuits in accordance with the monitored phase angle, wherein the compensation circuits are connectable in a step by step manner, each of the compensation circuits has a reactive value and a resistive value, and a product of the reactive value and the resistive value of all connected compensation circuits is substantially a constant value.

7. The phase angle correction circuit as claimed in claim 1, wherein the phase angle correcting variable load is connected in a cyclic manner at a frequency above an AC supply frequency.

8. The phase angle correction circuit as claimed in claim 7, wherein the cyclic connection frequency is approximately 20 KHz.

9. The method as claimed in claim 6, wherein the compensation circuits are connected and disconnected across the mains supply multiple times per cycle of the alternating current.

10. The method as claimed in claim 9, wherein the compensation circuits are connected and disconnected at an approximately 20 KHz rate.

11. The method as claimed in claim 9, wherein the connection/disconnection ratio is approximately 70/30.

12. The method as claimed in claim 9, wherein the connection/disconnection ratio is approximately 1/1.

13. The method as claimed in claim 6, wherein one of the compensation circuits is a parallel combination of a capacitor and a resistor.

14. The method as claimed in claim 6, wherein the reactance value of one of the compensation circuits is half or twice that of the next compensation circuit in a sequence.

* * * * *

UNITED STATES PATENT AND TRADEMARK OFFICE
CERTIFICATE OF CORRECTION

PATENT NO. : 8,384,361 B2 Page 1 of 1
APPLICATION NO. : 12/525235
DATED : February 26, 2013
INVENTOR(S) : Mohamed Sirajuddin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

First Day of September, 2015

Michelle K. Lee
*Director of the United States Patent and Trademark Office*